Sept. 26, 1961             N. MARTINAK             3,001,232
APPARATUS FOR THE CONTINUOUS MANUFACTURE
OF MICROPOROUS PLASTIC WEBS
Filed May 26, 1959
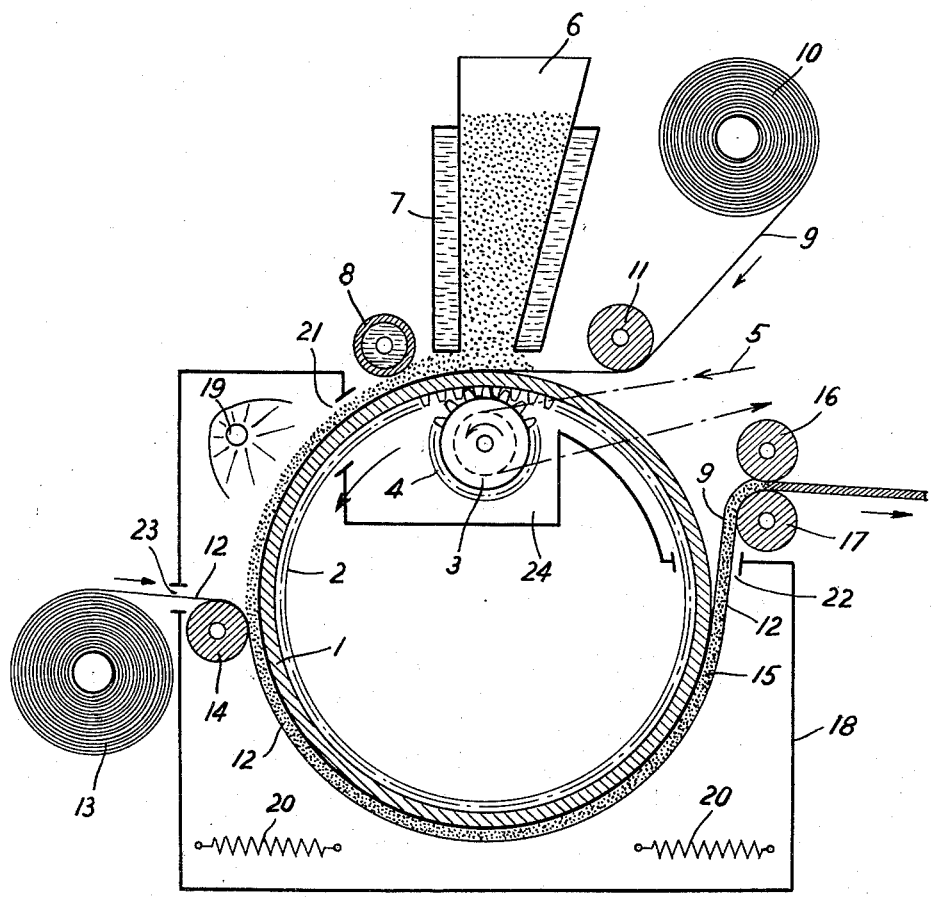
INVENTOR
Norbert Martinak
BY
Watson, Cole, Grindle + Watson
ATTORNEYS

United States Patent Office 3,001,232
Patented Sept. 26, 1961

3,001,232
APPARATUS FOR THE CONTINUOUS MANUFACTURE OF MICROPOROUS PLASTIC WEBS
Norbert Martinak, Carinthia, Austria, assignor to Akkumulatorenfabrik Dr. Leopold Jungfer, Carinthia, Austria
Filed May 26, 1959, Ser. No. 815,986
Claims priority, application Austria May 28, 1958
13 Claims. (Cl. 18—15)

In known apparatus for the continuous manufacture of microporous plastic webs by sintering a plastic powder layer the plastic powder is applied to a continuously moved support and moved by this support through a heating zone. The continuously moved support may consist of an endless conveyor belt or of a drum which is rotatable about a horizontal axis and to the apex of which a layer of the plastic powder is applied, whereas the drum rotates to move the applied layer through the heating zone, where sintering is effected.

The drum apparatus has the advantage of requiring only a small space and being simple in construction, particularly when the drum consists of a spokeless shell ring which is guided by carrying or guide rollers so that the interior of the drum is freely available for accommodating the heating devices, as has also been proposed (Austrian Patent No. 187,302).

In a known construction of such drum apparatus the shell ring is supported by rollers which are mounted in a machine base and which engage the underside of the ring on the outside thereof. The feeding device for the drum, e.g., a feed hopper, is disposed adjacent to the apex of the drum approximately diametrically opposite to the rollers. This construction involves difficulties in practice inasmuch as the heated shell ring is subjected to substantial temperature changes and thermal expansion at least when it is being put into operation. This thermal expansion results in a possibly considerable increase in the diameter of the ring. To achieve a layer of uniform thickness the application of the powder must be very uniform. For this reason, specially formed feed hoppers, scraper edges or scraper rolls are used, which must be exactly adjusted to a predetermined distance from the moved support. Such an exact adjustment is relatively difficult, however, if the support itself performs a movement relative to the feed hopper as a result of thermal expansion, as in the known drum apparatus described, because this involves an uncontrolled variation of the gap between the feeding device and the support.

It is an object of the present invention to eliminate the detrimental effects of the thermal expansion of said drum, more particularly of the shell ring, in apparatus of the type described hereinbefore. For this purpose the shell ring rather than being supported at its underside is suspended according to the invention from at least one carrying roller, which engages the apex portion of the ring on the inside of the ring. This support affords the advantage that the diameter of the ring may substantially vary in the case of temperature changes without involving a change in the distance between the support and the feeding point or the scraping edge. Another essential advantage of the invention resides in that the entire drum arrangement can be designed for very high thermal efficiency by enclosing the suspended ring by a heat insulating housing, which contains the heating devices and leaves free only a ring sector disposed between the point where the powder layer is applied and the point where the sintered plastic web is withdrawn whereas the housing is closed on all sides with the exception of inlet and outlet openings for the ring and, if desired, feed openings for layer material. The powder layer produced with the apparatus according to the invention may be provided in a simple manner with base and cover layers of paper, open-mesh glass wool fabrics or the like, which are combined with the powder layer during the sintering operation to form a compound body.

The suspended arrangement of the shell ring affords the further advantage that the underside of the ring remains free so that a major portion of the periphery of the ring may be utilized for the sintering operation. In many cases the sintered powder layer adheres sufficiently well to the periphery of the drum so that it will not detach by gravity from the underside of the drum. In order to avoid such a detaching of the layer also in other cases the apparatus according to the invention may comprise a supporting web which is disposed adjacent to the lower part of the drum and is moved together with the shell ring and suspended between rollers at the approaching and withdrawal points and which retains the sintered layer on the shell ring. This supporting ring may either be formed by a cover layer of the above-mentioned type, which is to be combined with the powder layer to form a compound body, or it may be formed by an endless belt which has only the supporting function and is moved back from the point of withdrawal to the approaching point.

The invention will now be described more fully with reference to an illustrative embodiment shown on the accompanying drawing. The drawing shows a spokeless cylindrical shell ring 1, the diameter of which is indicated on a highly reduced scale relative to the other parts of the apparatus in order to simplify the representation. This shell ring, which has, e.g., an internal ring gear 2, is supported by a carrying roller 3, which engages the inside of the ring adjacent to the apex thereof and which is formed with a gear 4. The roller 3 is driven, e.g., by a belt drive 5 and in turn drives the drum 1 by means of the gear 4 and the ring gear 2 in the sense of the arrow shown. Additional supporting rollers may be provided inside or outside the drum, if required, in order to prevent a swing movement of the drum.

A feed hopper 6 for plastic powder is disposed above the apex of the drum. The walls of the hopper are provided with a cooling jacket 7 in order to prevent an agglomeration of the powder in the feed hopper. The front wall of the funnel may directly form a scraper edge. According to another proposal, however, it is preferred to provide behind the hopper the roll 8, which is suitably also water-cooled and which revolves at a lower peripheral velocity than the ring so that the roll smoothens the powder layer applied. The powder may be applied directly to the periphery of the drum. In this case this periphery is treated with a parting agent, such as talc, in order to facilitate the detaching of the sintered layer. Alternatively the periphery of the drum may be covered first with a base layer 9, e.g., of paper or open-mesh glass wool fabric, which base layer 9 is fed to the drum from a supply spool 10 by way of a deflecting roller 11.

In the apparatus shown in the drawing the cover layer 12 is used in addition to this base layer. This cover layer consists, e.g., also of paper or open-mesh glass wool fabric and is fed from a supply spool 13 by way of a deflecting roller 14. The deflecting roller 14 prevents at the same time an inadmissible swing movement of the shell ring. The sintered powder layer 15, with the layers 9, 12 engaging opposite sides thereof and combined with it to form a compound body, is withdrawn from the drum by means of a pair of rolls 16, 17. This pair of rolls may be used at the same time for profiling the layer which is still deformable.

It is apparent that the layer 12 suspended between the rolls 14 and 17 firmly retains the powder layer 15 against the shell ring 1 to prevent a premature detaching from this ring.

To increase the thermal efficiency the entire ring is surrounded by a housing 18, which contains the heating devices, e.g., a radiant heater 19 in the first part of the sintering zone and heating resistors 20 for general heating. This housing is closed with the exception of the inlet opening 21 and the outlet opening 22 for the shell ring 1 and the inlet opening 23 for the cover layer 12 and is provided with heat insulating walls. Adjacent to the carrying and drive roller 3 the housing has a recess 24 so that the drive means are freely accessible for adjustment and repair.

It is obvious that various modifications of the invention are possible. For instance, the base layer 9 and/or the cover layer 12 may be eliminated or the cover layer 12 may be replaced, as has been mentioned hereinbefore, by an endless belt, which is detached from the powder layer 15 behind the roller 17 and fed back to the roller 14. Instead of a single carrying roller 3, several carrying rollers may be provided. Various modifications are also possible within the scope of the invention regarding the construction of the heaters.

The apparatus according to the invention is suitable for processing all sinterable plastic powders, such as powders of polyvinyl compounds, e.g., polyvinyl chloride or polyvinyl acetate, polyvinyl carbazole or polystyrene, as well as polycompounds of acrylic acid or methacrylic acid esters of methacrylic acid and other polymers, polymer mixtures or mixed polymers of these or similar compounds.

I claim:

1. Apparatus for the continuous manufacture of a microporous plastic web by sintering a plastic powder layer, comprising a spokeless rigid cylindrical shell ring with an axis extending horizontally, means for heating said ring, means for applying plastic powder to the outside periphery of said ring at a feeding point disposed adjacent to the upper most portion of said ring, and suspending means comprising at least one carrying roller which engages the inside periphery of said ring adjacent to the uppermost portion of said ring to support and rotate the latter around the horizontal axis.

2. Apparatus as set forth in claim 1, which comprises withdrawing means for withdrawing from said ring, from at a withdrawal point angularly spaced from said feeding point, a sintered plastic web formed on said ring from said plastic powder applied thereto, and a heat-insulating housing which contains said heating means and substantially all of said ring except for an exposed portion thereof between said withdrawal point and said feeding point, said housing being closed on all sides except for two openings through which said ring enters said housing and emerges therefrom.

3. Apparatus as set forth in claim 2, in which said housing is formed with an outwardly open recess below said exposed portion of said ring and said suspending means are at least partly disposed in said recess.

4. Apparatus as set forth in claim 1, which comprises withdrawing means for withdrawing from said ring, from at a withdrawal point angularly spaced from said feeding point, a sintered plastic web formed on said ring from said plastic powder applied thereto, and a heat-insulating housing which contains said heating means and substantially all of said ring except for an exposed portion thereof between said withdrawal and feeding points, moreover, means disposed outside said housing and operable to feed additional material to said drum at a point inside said housing, said housing being closed on all sides except for two openings through which said ring enters said housing and emerges therefrom, and a third opening through which said additional material is adapted to be introduced into said housing.

5. Apparatus as set forth in claim 4, in which said housing is formed with an outwardly open recess below said exposed portion of said ring and said suspending means are at least partly disposed in said recess.

6. Apparatus as set forth in claim 1, which comprises withdrawing means for withdrawing from said ring, at a withdrawal point angularly spaced from said feeding point, a sintered plastic web formed on said ring from said plastic powder applied thereto, and feeding means for feeding to the outside periphery of said ring, at a point disposed between said withdrawal point and said feeding point, a base layer adapted to be combined with said powder by sintering to form a compound body.

7. Apparatus as set forth in claim 6, in which said feeding means comprise a supply spool carrying a web adapted to form said base layer.

8. Apparatus as set forth in claim 6, in which said feeding means comprise a supply of open-mesh glass wool fabric adapted to form said base layer.

9. Apparatus as set forth in claim 1, which comprises withdrawing means for withdrawing from said ring, at a withdrawal point angularly spaced from said feeding point, a sintered plastic web formed on said ring formed from said plastic powder applied thereto, and feeding means for feeding to said plastic powder on said ring, at a point disposed between said feeding point and said withdrawal point, a cover layer adapted to be combined with said powder by sintering to form a compound body.

10. Apparatus as set forth in claim 9, in which said feeding means comprise a supply spool carrying a web adapted to form said cover layer.

11. Apparatus as set forth in claim 9, in which said feeding means comprise a supply of open-mesh glass wool fabric adapted to form said base layer.

12. Apparatus as set forth in claim 1, which comprises withdrawing means for withdrawing from said ring, at a withdrawal point angularly spaced from said feeding point beyond at least a part of the underside of said ring, a sintered plastic web formed from said plastic powder, and means for retaining said powder and plastic web on the underside of said ring said means comprising a supporting web substantially hugging the underside of said ring as far as to said withdrawal point, and two rollers supporting said web adjacent to the ends of the portion thereof which hugs said ring, and means for moving said web at a velocity which is equal to the peripheral velocity of said ring.

13. Apparatus as set forth in claim 1, which comprises withdrawing means for withdrawing from said ring, at a withdrawal point angularly spaced from said feeding point beyond at least a part of the underside of said ring, a sintered plastic web formed from said plastic powder, feeding means for feeding to said plastic powder on said ring, at a point disposed between said feeding point and said withdrawal point, a supporting web adapted to form a cover layer and to be combined with said powder by sintering to form a compound body, said feeding and withdrawing means comprising each a roller supporting said supporting web said rollers being arranged to cause said supporting web to hug substantially the underside of said ring as far as to said withdrawal point.

References Cited in the file of this patent

UNITED STATES PATENTS

| | | |
|---|---|---|
| 80,809 | Cobb and Hill | Aug. 11, 1868 |
| 2,069,589 | Meijling et al. | Feb. 2, 1937 |
| 2,329,421 | Shields | Sept. 14, 1943 |
| 2,688,155 | Nadeau et al. | Sept. 7, 1954 |
| 2,734,553 | Rawls | Feb. 14, 1956 |
| 2,742,668 | Hubmann | Apr. 24, 1956 |
| 2,842,796 | Rhodes | July 15, 1958 |
| 2,927,345 | Hansen et al. | Mar. 8, 1960 |